Figure 1:
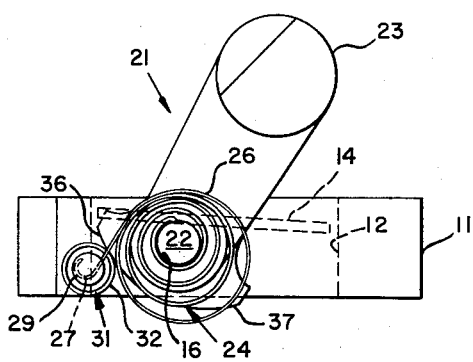

Jan. 19, 1965  A. G. MIDDLER  3,166,294
BUTTERFLY VALVE
Filed May 1, 1961

ALEXANDER G. MIDDLER
INVENTOR.

BY John R. Faulkner
Thomas H. Oster

ATTORNEYS 3,166,294
BUTTERFLY VALVE
Alexander G. Middler, Detroit, Mich., assignor to Ford Motor Company, Dearborn, Mich., a corporation of Delaware
Filed May 1, 1961, Ser. No. 106,778
2 Claims. (Cl. 251—287)

This invention relates generally to valve means and more particularly to a butterfly valve structure used as a control valve in an internal combustion engine exhaust system.

It is common practice to heat the combustible mixture of an internal combustion engine whenever the engine temperature is subnormal. Frequently this is accomplished through the use of a thermostatically actuated control valve which is thermally connected to the engine.

The valve, which is located in the exhaust system, generally has a closure member eccentrically supported on a shaft that is connected to a thermostatic spring. During times of subnormal engine temperature, the thermostatic spring urges the closure member to a closed position so that exhaust gases may be used to heat the combustible mixture in the induction system. A weighted rotation limiting member is also connected to the shaft and tends to bias the closure member toward an open position. The weighted rotation limiting member is prevented from travel beyond the desired range of the closure member by a stop.

Because of intermittent and varying exhaust gas pressures, engine and vehicular vibrations, and varying engine temperatures, the closure member may quickly rotate from a fully open to a fully closed position and vice versa. Objectionable noise is frequently caused when the weighted rotation limiting member strikes the stop. Oftentimes, the stop is bent by the high impact force of the rotation limiting member.

Attempts have been made in the art to eliminate both the noise and the high impact force when the weighted rotation limiting member strikes the stop. Cantilever springs affixed to the rotation limiting member are most commonly used to absorb the inertial energy of the rotation limiting member and reduce the impact noise. The operation and structure of valves made in accordance with these well known means are shown in United States Letters Patent 2,564,112 issued on August 14, 1951, in the name of Kittler, and United States Letters Patent 2,819,025 issued on January 7, 1958, in the names of Else et al. Valves made in accordance with these patents however are still not free from objectionable noise and occasionally bend the stop.

An object of this invention therefore is directed to an improved means for dissipating inertial energy.

Another object of this invention is to provide means by which the inertial energy of a rotating member is dissipated by a yielding member with a minimum amount of noise.

Still another object of this invention is to provide a butterfly valve having a rotation limiting member and a stop provided with spring means for dissipating the inertial energy of said rotation limiting member.

Still a further object of this invention is to provide a thermostatically actuated exhaust control butterfly valve having a weighted rotation limiting member, a stop, and a wound spring supported by said stop for dissipating inertial energy of the rotation limiting member by elastic radial displacement.

Still a further object of this invention is to provide a butterfly valve for an exhaust system which is simple in construction, dependable in operation and economical to manufacture.

Figure 3:
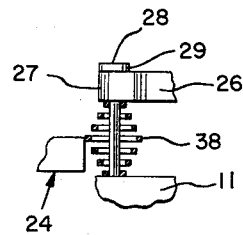
Figure 4:
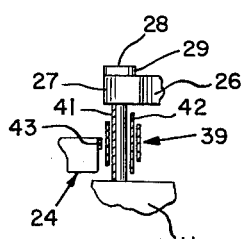
Figure 2:
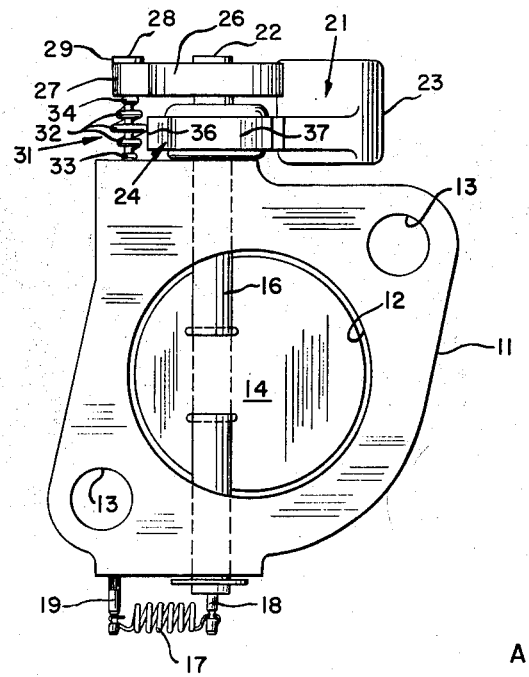

Other objects and advantages of this invention will become more apparent when considered in connection with the accompanying drawings, wherein:

FIGURE 1 is an elevational view of the butterfly valve made in accordance with this invention, and FIGURE 2 is a bottom plan view of the butterfly valve shown in FIGURE 1, and FIGURE 3 is a fragmentary view partly in section of the weighted rotation limiting member and a stop supporting an alternate spring construction, and FIGURE 4 is a view similar to FIGURE 3 and shows still another alternate spring construction.

Referring now to the drawings and in particular FIGURES 1 and 2, the butterfly valve comprises a housing 11 having a passage 12 extending therethrough. Housing 11 is adapted to be connected to the exhaust system of an internal combustion engine by studs (not shown) which extend through the openings 13 in the housing 11. A closure member or valve 14 is mounted eccentrically upon a shaft 16 which extends through the passage 12 and terminates outside of the housing 11 in terminal ends 18 and 22. Spring 17 yieldably connects the terminal end 18 to an anchor 19 to prevent rattling of the shaft 16 in the housing 11.

A rotation limiting member 21 is secured to the terminal end 22 of the shaft 16. Rotation limiting member 21 is provided with an integral weighted end portion 23 at one end and a curved portion 24 at the opposite end. Rotation limiting member 21 is generally disposed on one side of a line that includes the axis of the shaft 16 and perpendicular to the face of the closure member 14. Gravitational pull is used therefore to bias the closure member 14 in a direction to open the passage 12.

In FIGURE 1 the weighted end portion 23 tends to move the rotation limiting member 21 and the closure member 14 in a clockwise direction. Exhaust gas pressures against the closure member 14 also tend to move the closure member 14 in the passage 12 in a clockwise direction.

Closure member 14 also is actuated by a thermostatic spring 26. The inner convolution of the thermostatic spring 26 is conventionally secured to the terminal end 22 of the shaft 16. The outer convolution of thermostatic spring 26 terminates in a U-shaped end portion 27 which fits around the stop 28. Stop 28 is anchored in the housing 11 in a conventional manner. Head 29 of the stop 28 prevents axial movement of the thermostatic spring 26 away from the housing 11. Thermostatic spring 26 is sufficiently strong to overcome the gravitational pull of the weighted end portion 23 of the rotation limiting member 21 under static conditions.

The energy dissipating barrel-shaped wound spring is indicated at 31 and comprises one or more intermediate spiral spring convolutions 32, end convolution 33 adjacent the housing 11, and the opposite end convolution 34 adjacent the U-shaped end portion 27 of the thermostatic spring 26. Spring 31 may be formed of round wire spring stock. When assembled upon the stop 28, spring 31 may be under compression.

Curved portion 24 of the rotation limiting member 21 is provided with spaced apart curved end portions 36 and 37. As the closure member 14 rotates to either the full closed or the full open position, the respective curved end portion 36 or 37 will engage one or more of the intermediate spring convolutions 32. The inertial energy of the rotation limiting member 21 is dissipated by the radial displacement of the intermediate spring convolutions 32.

Desired deceleration and stoppage of the rotation limiting member 21 may be obtained by changing the engagement of the curved end portions 36 and 37 and the barrel-shaped wound spring 31. This may be done by changing the configuration of the curved end portions 36 and 37 between a wide range. For example, the engagement with the barrel-shaped wound spring 31 may be tangential wherein the deceleration takes longer but is smoother and quieter. At the other extreme, the engagement may be made so that the curved end portions 36 and 37 will fully engage the barrel-shaped wound spring 31. When this occurs, the deceleration will be faster, more abrupt and noisier. Changes may also be made in the configuration of the spring (more or less convolutions being engaged by the curved end portions) and in the stiffness of the spring (which affects the radial displacement characteristics).

The operation of the device is simple. In the cold and static position of the butterfly valve, as is shown in FIGURE 1, thermostatic spring 26 has moved the rotation limiting member 21 counterclockwise. The curved end portion 36 engages and is stopped by one or more of the intermediate spring convolutions 32 of the barrel-shaped wound spring 31.

When the internal combustion engine is suddenly accelerated, an appreciable increase in gas pressure takes place which reacts against the closure member 14 to bias the valve in a clockwise direction. The weighted end portion 23 assists in continuing the movement of the closure member 14 to open the passage 12. Generally the movement is sudden and the rotation is such that the curved end portion 37 will engage one or more of the intermediate spring convolutions 32 thereby bringing the closure member 14 to a quick and substantially noiseless stop in the open position.

Upon the sudden deceleration of the internal combustion engine, gas pressure decreases and the thermostatic spring 26 returns the closure member 14 and the rotation limiting member 21 clockwise to its former position or a new position depending upon the thermal condition of the engine. The counterclockwise movement of the closure member 14 and the rotation limiting member 21 may be sudden whereby the curved end portion 36 will engage one or more of the intermediate spring convolutions 32 in the same manner as had the curved portion 37.

Referring now to FIGURE 3, an alternate energy dissipating barrel-shaped wound spring is indicated at 38 and is comprised of spring wire of square cross section in place of the round cross section wire used in the embodiment of FIGURES 1 and 2.

FIGURE 4 also shows an alternate embodiment of the invention. The energy dissipating barrel-shaped wound spring is indicated at 39 and is in the form of a coil. It is provided with an inner convolution 41 of substantial width, an intermediate convolution 42 of lesser width, and an outer convolution 43 of still lesser width.

It will be understood that this invention is not to be limited to the exact construction shown and described but various changes and modifications may be made without departing from the spirit and scope of the invention as defined in the appended claims.

I claim:
1. A butterfly valve comprising a housing having a flow passage therein, a shaft journaled by said housing, a closure member affixed to said shaft within said flow passage, said shaft and said closure member being rotatable from a closed position wherein flow is substantially retarded to an open position permitting flow, an end of said shaft extending adjacent said housing at one side thereof, a pin secured to said housing adjacent to said shaft with its longitudinal axis substantially parallel to said shaft, a coil spring encircling said pin, and a motion limiting member affixed to said shaft end for rotation therewith, said motion limiting member having a first portion adapted to contact said coil spring upon movement of said closure member into its open position and a second portion adapted to contact said coil spring upon movement of said closure member to its closed positiion to absorb the inertial energy of said motion limiting member, said closure member, and said shaft upon impact-contact of said portions with said coil spring.

2. A butterfly valve as defined by claim 1 wherein the coil spring has convolutions spaced at different radial distances from its axis and the first and second portions of the motion limiting member contact an increasing number of said convolutions as said coil spring deflects to offer a progressively increasing resistance to further deflection of said coil spring.

References Cited in the file of this patent

UNITED STATES PATENTS

| | | |
|---|---|---|
| 539,718 | Beall | May 21, 1895 |
| 1,945,955 | Price | Feb. 6, 1934 |
| 2,052,079 | Caesticker | Aug. 25, 1936 |
| 2,285,244 | Williams | June 2, 1942 |
| 2,564,112 | Kittler | Aug. 14, 1951 |
| 2,957,719 | Hafstad | Oct. 25, 1960 |